United States Patent
Iverson et al.

(10) Patent No.: US 12,548,869 B2
(45) Date of Patent: Feb. 10, 2026

(54) INJECT-VENT PORT DESIGN FOR ENERGY STORAGE DEVICE

(71) Applicant: SOUTH 8 TECHNOLOGIES, INC., San Diego, CA (US)

(72) Inventors: Denton Iverson, La Mesa, CA (US); Victoria Thai, San Diego, CA (US); Nick Wayland, Encinitas, CA (US); Andrea Biondi, San Diego, CA (US); Cyrus Rustomji, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/811,533

(22) Filed: Aug. 21, 2024

(65) Prior Publication Data

US 2025/0070439 A1    Feb. 27, 2025

Related U.S. Application Data

(63) Continuation of application No. PCT/US2024/043151, filed on Aug. 21, 2024.

(60) Provisional application No. 63/534,213, filed on Aug. 23, 2023.

(51) Int. Cl.
| | |
|---|---|
| *H01G 9/12* | (2006.01) |
| *H01M 50/30* | (2021.01) |
| *H01M 50/325* | (2021.01) |
| *H01M 50/655* | (2021.01) |
| *H01G 11/18* | (2013.01) |

(52) U.S. Cl.
CPC ............ *H01M 50/655* (2021.01); *H01G 9/12* (2013.01); *H01M 50/325* (2021.01); *H01M 50/394* (2021.01); *H01G 11/18* (2013.01)

(58) Field of Classification Search
CPC ............ H01M 50/655; H01M 50/394; H01M 50/325; H01G 9/12; H01G 11/18
See application file for complete search history.

(56) References Cited

U.S. PATENT DOCUMENTS

| | | |
|---|---|---|
| 4,328,289 A | 5/1982 | Zupancic |
| 4,328,290 A | 5/1982 | Szymborski |
| 4,780,378 A | 10/1988 | McCartney |
| 2019/0379019 A1 | 12/2019 | Fukuda et al. |
| 2020/0067032 A1* | 2/2020 | Davies ................ H01M 50/184 |

OTHER PUBLICATIONS

International Search report for PCT/US2024/043151 issued Oct. 10, 2024. (9 pages).

* cited by examiner

*Primary Examiner* — Lingwen R Zeng
(74) *Attorney, Agent, or Firm* — Manuel de la Cerra

(57) ABSTRACT

Mechanisms and methods for pressurized fluid injection, evacuation, and venting from containment vessels, such as the housing for a battery or capacitor, using an elastomeric sealing vent mechanism are disclosed. The invention describes designs and methods in which a fluid injection port is plugged with an elastomeric sealing vent, serving as both the primary fluid sealing mechanism and the safety relief mechanism in case of over-pressurization or over-heating.

7 Claims, 3 Drawing Sheets

INJECT-VENT PORT DESIGN FOR ENERGY STORAGE DEVICE

CROSS-REFERENCE TO RELATED APPLICATIONS

This application claims priority to U.S. Application 63/534,213 filed on Aug. 22, 2023, and claims priority as a continuation of PCT/US24/43151 filed on Aug. 21, 2024, the entire contents of both applications are incorporated herein by reference.

This application is related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; U.S. Pat. No. 11,049,668 issued Jun. 29, 2021; U.S. Pat. No. 11,342,615 issued on May 24, 2022; U.S. Pat. No. 10,784,532 issued on Sep. 22, 2020; U.S. Pat. No. 11,984,614 issued on May 14, 2024; U.S. Pat. No. 11,958,679 issued on Apr. 16, 2024; PCT/US22/31594 filed on May 31, 2022; PCT/US23/17720 filed on Apr. 6, 2023; PCT/US23/28104 filed on Jul. 19, 2023; PCT/US23/28105 filed on Jul. 19, 2023; PCT/US24/16784 filed on Feb. 21, 2023; PCT/US24/18746 filed on Mar. 6, 2024; PCT/US24/33428 filed on Jun. 11, 2024; PCT/US24/25771 filed on Apr. 23, 2024; PCT/US24/31912 filed on May 31, 2024; U.S. Application 63/418,703 filed on Oct. 24, 2022; PCT/US24/27501 filed on May 2, 2024; PCT/US24/31325 filed on May 29, 2024; U.S. Application 63/652,616 filed on May 28, 2024; PCT/US24/40203 filed on Jul. 30, 2024; U.S. application Ser. No. 18/788,809 filed on Jul. 30, 2024; U.S. application Ser. No. 18/643,134 filed on Apr. 23, 2024; U.S. application Ser. No. 18/807,938 filed Aug. 17, 2024; and U.S. Application 63/684,297.

FIELD OF THE INVENTION

This invention relates to the design, materials, mechanisms, and methods for the injection, containment, evacuation, and venting of pressurized fluids from a vessel, such as a battery housing.

BACKGROUND OF THE INVENTION

Electrochemical energy storage devices, such as lithium-ion batteries, often utilize a vent built into the cell housing to safely depressurize the battery cell during an over pressurization event. These vents are often in the form of a burst disc which is opened during an over pressurization event. These burst discs are often installed onto the battery cell lid. Unfortunately, it is difficult to carefully adjust battery cell vent burst discs. Because of the relatively low venting pressure (100~300 psi) of these cells, it is practically difficult to machine or stamp a vent out of a metal member which will consistently vent. Often errors are as large as 50% of the desired vent pressure due to inconsistent machining or stamping. Further, there is no direct correlation of pressure to temperature, using standard battery cell chemistry, thus the vent may open at an undesirable temperature.

Another example venting structure is a diaphragm valve utilizing a rubber flange that is engaged via a spring. A separate assembly is used to also fill the vessel, such as a port which is sealed using a needle valve, ball valve, diaphragm valve, or check valve. These methods can have a wide range of venting pressures and add mass, volume, and cost to the assembly.

During manufacture of the electrochemical energy storage devices, the device is filled with the electrolyte before the lid is installed or through an opening on the cell lid. If filled through an opening on the cell lid, the opening is later plugged. Having separate structures for filling and venting increases the manufacture expense of the electrochemical device.

It would therefore be advantageous from a cost, manufacturing, volume, and mass standpoint to utilize the same mechanical components to seal the electrolyte port and vent the cell during an overpressure event. It would be further advantageous if the vent had better control of the pressure and temperature at which it opens.

SUMMARY OF THE INVENTION

The present invention discloses mechanisms and methods for pressurized fluid injection, evacuation, and venting from containment vessels, such as the housing for a battery or capacitor, using an injection and venting assembly. This assembly may include an injection-vent port that forms an opening between an ambient side of the assembly and the vessel side of the assembly. The assembly may also have a sealing interface connected to the injection-vent port and an elastomeric member constructed to seat in the sealing interface, creating a seal between the ambient side of the assembly and the vessel side of the assembly. The elastomeric member is constructed to deform and thereby open the seal when exposed to a predetermined temperature, predetermined pressure, or both.

The assembly may also include a diffuser lid positioned adjacent to the injection-vent port on the ambient side of the assembly. This lid may have vent holes configured to allow a fluid escape in a radial direction.

The elastomer member may be a sphere, a half sphere, a pyramidal shape, an oval shape, or a cone. The elastomer member may be made of EPDM, Silicon, butyl rubber, natural rubber, nitrile, neoprene, perfluoroalkoxy alkane (PFA), FKM, polyurethane, HDPE, or combination thereof.

A device may be constructed with this assembly. The device includes a containment vessel connected to the fluid injection and venting assembly just described. The device also includes a pressurized fluid, a liquefied gas, or a liquefied gas electrolyte. The containment vessel may be housing for a battery or capacitor.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1:
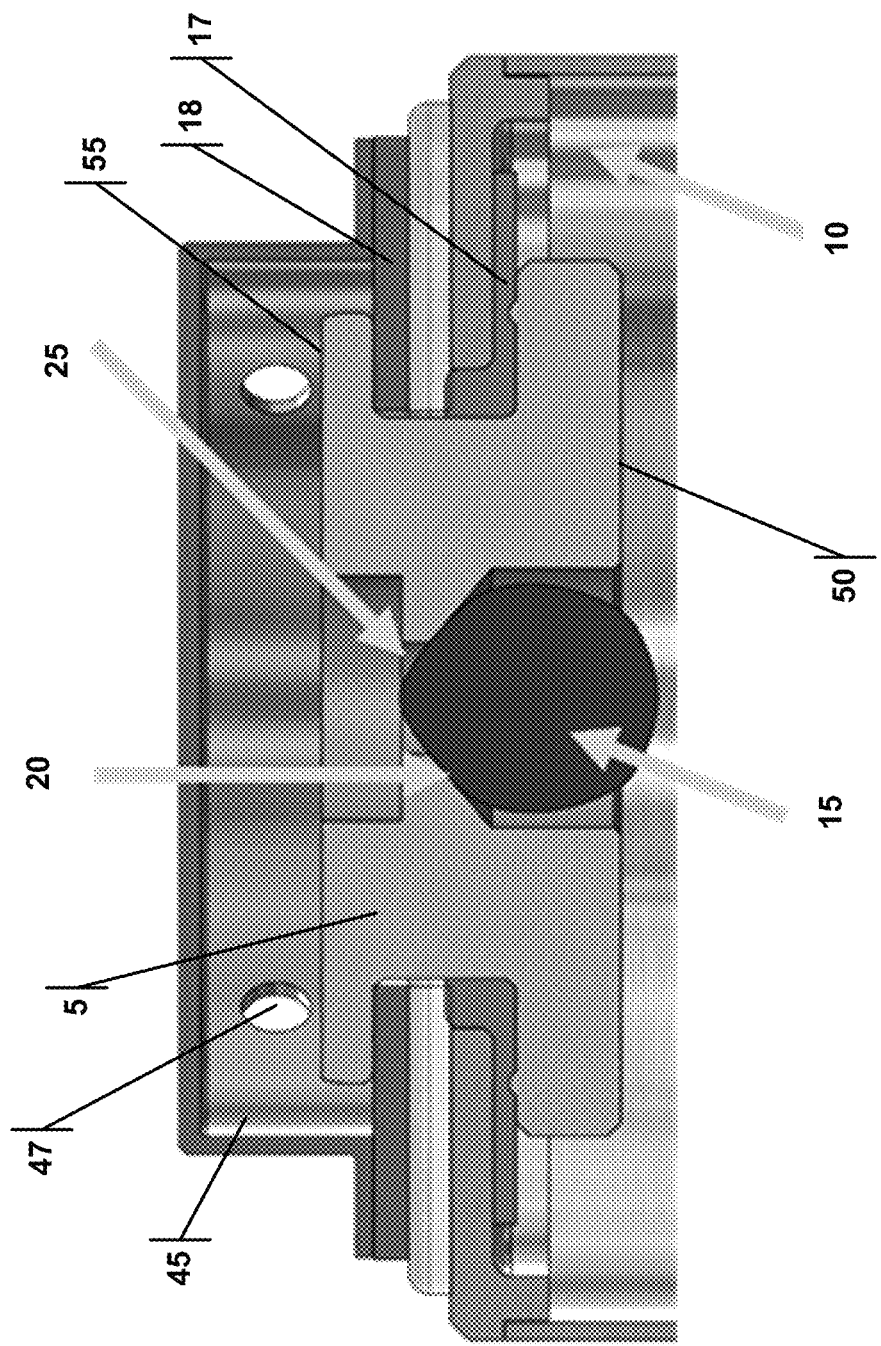
FIG. 1 is a cross section of containment vessel top lid with an assembly comprising an elastomer member, sealing interface, injection-vent port, diffuser lid, and vent holes.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

5 Elastomeric Sealing Vent Assembly
10 Containment Vessel
15 Elastomeric Member
17 Insulator
18 Insulator
20 Sealing Interface
25 Injection-Vent Port
30 Fluid Injection Flow
35 Internal Pressure
40 Fluid Escape Flow
45 Diffuser Lid
47 Vent Holes
50 Assembly Vessel Side
55 Assembly Ambient Side Disclosed is a mechanical design in which both a fluid sealing and fluid venting system is designed into the same mechanical system. This system, referred to as an "elastomeric sealing vent", serves the dual purpose of the primary sealing mechanism after fluid injection and as the safety venting mechanism. The fluid medium can be a pressurized fluid that is under a pressure greater than 1.01325 bar. The fluid medium may also be a liquefied gas which is comprised of one or more components in which at least a first component has a vapor pressure above 1.01325 bar at a room temperature of 20° C. The pressurized fluid may also be a liquefied gas electrolyte for an electrochemical device such as a battery or capacitor. The vessel in which the fluid is also injected may also be a housing for an electrochemical device, such as a battery or a capacitor. The various methods in which an elastomeric sealing vent could be used to evacuate pressurized fluid from a sealed vessel are also disclosed.

Conventional methods of pressurized fluid evacuation utilize a thin, scored metal foil designed to rupture should the fluid be pressurized above a calibrated pressure. These foil "burst disks", while thin and low profile, are cost inhibitive and are prone to a wide variation of venting pressures.

A second conventional method of pressurized fluid evacuation is a diaphragm valve, which utilizes an elastomeric diaphragm that is sealed against a flange using a spring. One benefit to this type of venting mechanism is that the ventilation pressure can be altered with varying the force of the spring; achieved by compressing or relieving the spring. While diaphragm valves adaptability is useful, such valves add unnecessary mass and volume to a system when a single known pressure is desired.

Figure 2A:
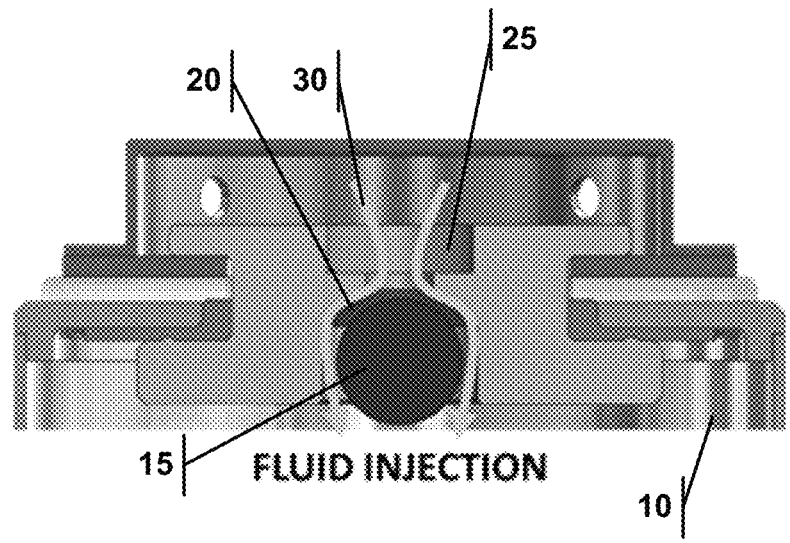
FIG. 2A is a cross section showing the relative position of the elastomer member during fluid injection.
Figure 2B:
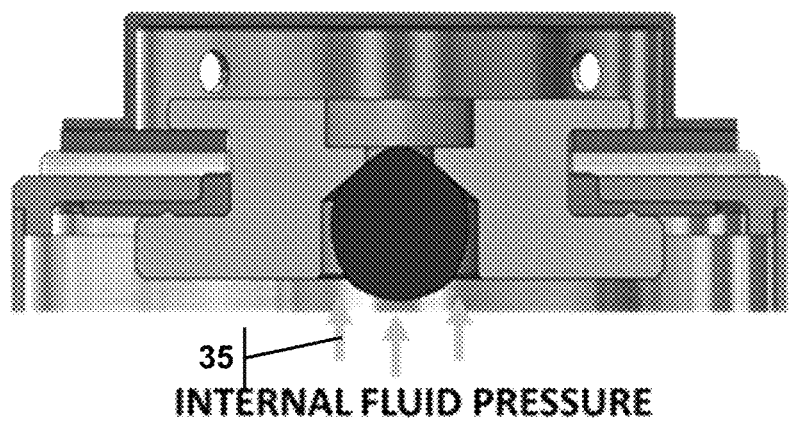
FIG. 2B is a cross section showing the relative position of the elastomer member under normal operation with internal fluid pressure engaging the elastomer member against a sealing interface.
Figure 2C:
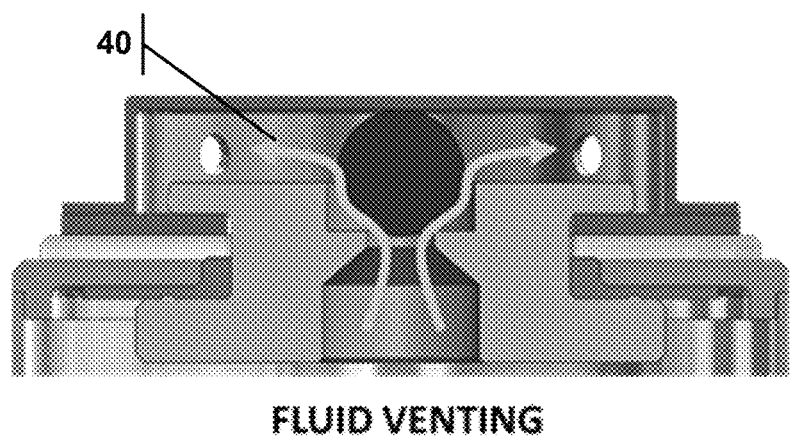
FIG. 2C is a cross section showing the relative position of the elastomer member during fluid venting.

Referencing FIG. 1, the disclosed elastomeric sealing vent assembly 5 that covers a containment vessel 10. The assembly 5 has a vessel side 50 and an ambient side 55. The assembly 5 includes an elastomer member 15, a sealing interface 20, and an injection-vent port 25 forming an opening between the vessel side 50 and the ambient side 55. Electrical insulators 17 and 18 may maintain electrical isolation between the diffuser lid 45 and the containment vessel 10. Upon fluid injection shown in FIG. 2A, the fluid may flow through the injection-vent port 25 and around the elastomer member 15 and into the containment vessel 10 (shown as fluid flow 30). In this disclosure, the injection port and vent are one in the same mechanical port. When the fluid injection is completed, the elastomer member 15 is then pressed against the sealing interface 20 by an internal pressure created by the injected fluid (shown by arrows 35) which seals the fluid within the containment vessel 10, as shown in FIG. 2B. The internal pressure 35 may be generated by the natural vapor pressure of the fluid or the pressure used to force the fluid into the containment vessel 10. A mechanical force created by a spring or other mechanical structure may also force the elastomer member 15 to seat with the sealing interface 20. In normal operation (nominal pressure and temperature) the elastomer member 15 is stiff enough to create a seal at the sealing interface 20 and not be pushed through the injection-vent port 25. However, as shown in FIG. 2C under a non-nominal event, such as over pressurization or over temperature, or both, the elastomer member 15 is deformed enough to be forced through the injection-vent port 25, disengaging the elastomer member 15 from the sealing interface 20 and allowing fluid escape from the vessel (arrows 40).

This design helps to save mass and volume by using a port 25 on the lid 45 connecting the assembly vessel side 50 and assembly ambient side 55 as both an injection port and vent port, and the same port containing the sealing interface. The total height of the vessel can be minimized by encapsulating the elastomeric sealing vent assembly 5 within a compact space rather than having a separate electrolyte injection port and vent port. The venting pressure can also be calibrated by varying the size and shape of the injection-vent port 25, the elastomer member 15, or both. For example, the injection-vent port 25 may be circular or cylindrical in shape and a larger diameter may lower the vent pressure while a smaller diameter may increase the vent pressure. In another instance, the elastomer member 15 may be a spherical shape and a larger diameter would increase the vent pressure and a smaller diameter may lower the vent pressure. Other shapes for the elastomer member 15 may include, but are not limited to, a half sphere, a pyramidal shape, oval shape, cone etc., to optimize for mass, cost, volume, etc.

When a positive pressure differential exists between the inside (assembly vessel side 50) and outside (assembly ambient side 55) of the containment vessel 10, the elastomeric member 15 is seated against the sealing interface 20 and creates the primary seal for the containment vessel 10. A venting scenario may be created by (1) an over pressurization event, (2) over temperature event, or (3) both an over pressurization and over temperature events. An over pressurization event causes the elastomeric member 15 to deform and begins to be squeezed and elongated into the injection-vent port 25. At a critical point, the elastomer member 15 is no longer creating a seal along the sealing interface 20 and may allow for fluid escape through venting from the containment vessel 10 (see FIG. 2C). Often, the elastomer member 15 may be extruded completely through the injection-vent port 25, allowing for rapid evacuation of the fluid from the containment vessel 10. Under an over temperature event, the elastomer member 15 may begin to soften, which makes it easier to be squeezed and forced into the injection-vent port 25. Similar to the over pressurization event, once the elastomer member 15 is dislodged such that the sealing interface is compromised, the fluid may be allowed to vent from the containment vessel 10. Lastly, the combination of an over pressurization and over temperature event may similarly cause the elastomer member 15 to become dislodged and allow for fluid venting from the containment vessel 10.

An optional diffuser lid 45 may also be mechanically installed on the elastomeric sealing vent assembly 5 above the injection-vent-port 25 before or after fluid injection. The diffuser lid 45 is used to contain the elastomeric member 15 as it extrudes through the injection-vent port 25 so it does not become a projectile hazard, but still allow for fluid to escape. Further, the diffuser lid 45 may also be used to redirect the venting fluid stream into a preferred direction through vent holes 47 on the diffuser lid 45. For example, allowing fluid venting into a radial direction through vent holes 47 may be preferred since the pressure vessel will experience a minimal or net-zero force during evacuation. This is beneficial to minimize the containment vessel 10 from becoming a projectile hazard.

Examples of potential materials for the elastomer member 15 include EPDM, Silicon, butyl rubber, natural rubber, nitrile, neoprene, perfluoroalkoxy alkane (PFA), FKM, polyurethane, HDPE, or any combination thereof. The injection-vent port 25 is generally integrated with the sealing interface 20 and be made of a variety of materials including ceramic or metals such as aluminum, steel, stainless steel, titanium, copper, brass, nickel, molybdenum, carbon, graphite, or alloys thereof.

It should be noted the disclosed invention using an injection-vent port design would otherwise not be practical using a conventional liquid based electrolyte in standard batteries. This is because the disclosed injection-vent port design requires an internal pressure to maintain a seal of the elastomer member against the sealing interface which is not common with conventional battery cells. Further, there is no direct correlation between temperature and pressure in conventional cells. The elastomer member will show different durometer hardness at varying temperatures which may adjust the fluid vent pressure accordingly. Thus, to allow for an effective and predictable fluid vent temperature and pressure, a direct correlation between temperature and pressure must exist, such as in the liquefied gas electrolyte system.

5.1 Example 1

Figure 3:
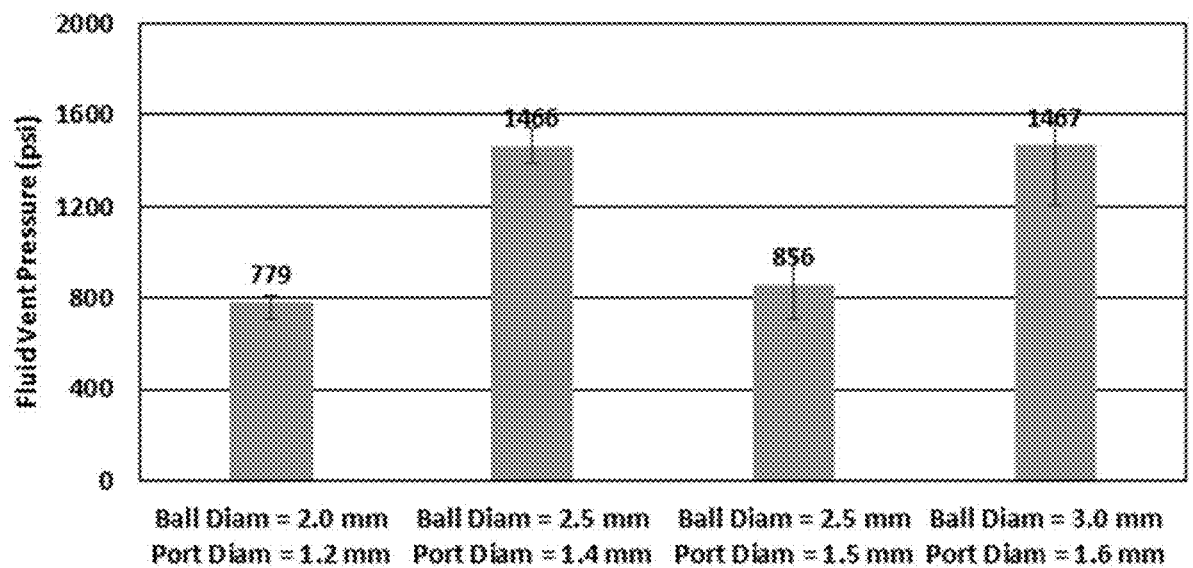
FIG. 3 is a graph detailing fluid vent pressures from the injection-vent port using EPDM spherical shaped ball.

FIG. 3 shows the fluid vent pressure through injection-vent ports of varying diameter using a spherical shaped elastomer member comprised of EPDM elastomer having varying spherical diameters. The testing was done at 100° C. It is seen that the fluid vent pressure can be varied by adjusting the port diameter and the elastomer size. This has the benefit of modifying the geometries to occupy a small space and a minimal mass to minimize the injection-vent port mechanism on the containment vessel.

5.1 Example 2

Figure 4:
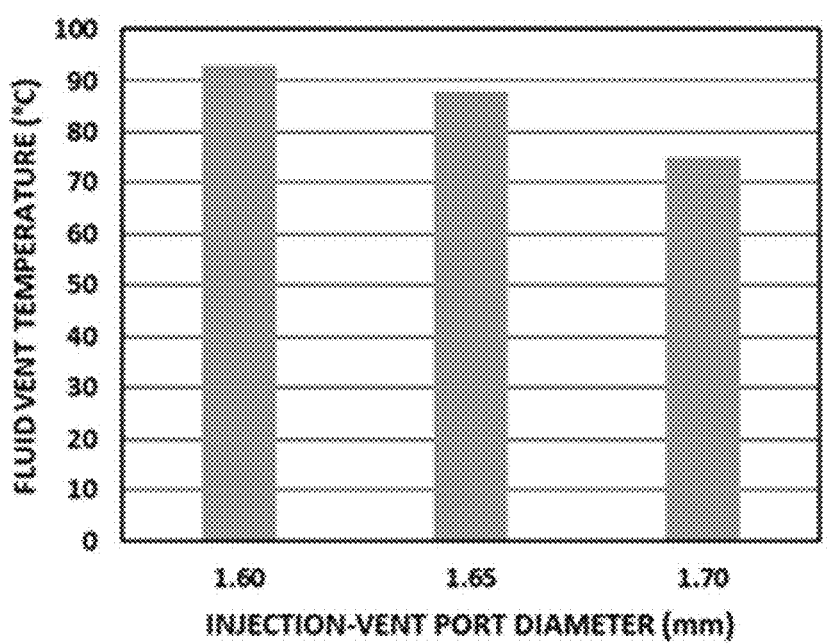
FIG. 4 is a graph detailing fluid vent temperatures from a containment vessel when the fluid is a liquefied gas electrolyte and the containment vessel is a battery housing. The elastomer member is a spherical shaped ball of EPDM material having a diameter of 3 mm.

FIG. 4 shows the fluid vent pressure through injection-vent ports of a containment vessel using a 3 mm spherical shaped EPDM elastomer member and varying injection-vent port diameters when the fluid is a liquefied gas electrolyte and the containment vessel is a battery housing. The liquefied gas electrolyte has a vapor pressure which varies with temperature; increasing temperature increases the vapor pressure while decreasing the temperature lowers the vapor pressure. Using the injection-vent port having varying port diameters, one may adjust the fluid vent temperature due to the temperature-pressure relationship. This allows safe venting of a battery device at a pre-determined venting temperature. FIG. 4 shows the relationship with increasing port diameter and lowering fluid vent pressure.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A fluid injection and venting assembly (5) for use with a containment vessel (10), the assembly (5) comprising:
    an injection-vent port (25) that forms an opening between an ambient side of the assembly (55) and the vessel side of the assembly (50);
    a sealing interface (20) connected to the injection-vent port (25);
    an elastomeric member (15) constructed to seat in the sealing interface (20) and create a seal between the ambient side of the assembly (55) and the vessel side of the assembly (50);
    wherein the elastomeric member (15) is constructed to deform and thereby open the seal when exposed to a predetermined pressure, predetermined temperature, or both;
    wherein the assembly is operable in:
        a mass transfer configuration in which the elastomeric member (15) is not seated in the sealing interface (20) and the injection-vent port (25) is open to allow mass transfer through the injection-vent port (25);
        a sealed configuration in which the elastomeric member (15) is seated in the sealing interface (20) and the injection-vent port (25) is sealed to prevent mass transfer through the injection-vent port (25); and
        a vented configuration in which the elastomeric member (15) is displaced from the sealing interface (20) and retained between the injection-vent port (25) and a diffuser lid (45) to allow venting of fluid from the vessel side of the assembly (50) to the ambient side of the assembly (55) while preventing the elastomeric member (15) from becoming a projectile.

2. The assembly of claim 1, further comprising a diffuser lid (45) positioned adjacent to the injection-vent port (25) on the ambient side of the assembly (55).

3. The assembly of claim 2, wherein the diffuser lid (45) comprises vent holes (47) configured to allow a fluid escape in a radial direction.

4. The assembly of claim 1, wherein the elastomer member (15) comprises a sphere, a half sphere, a pyramidal shape, an oval shape, or a cone.

5. The assembly of claim 1, wherein the elastomer member (15) comprises EPDM, Silicon, butyl rubber, natural rubber, nitrile, neoprene, perfluoroalkoxy alkane (PFA), FKM, polyurethane, HDPE, or combination thereof.

6. A device comprising:
    a containment vessel (10) connected to a fluid injection and venting assembly of claim 1;
    a pressurized fluid, a liquefied gas, or a liquefied gas electrolyte.

7. The device of claim 6, wherein the containment vessel is a housing for a battery or capacitor.

* * * * *